(12) United States Patent
He

(10) Patent No.: US 10,890,807 B2
(45) Date of Patent: Jan. 12, 2021

(54) DISPLAY SUBSTRATE, MANUFACTURING METHOD OF THE DISPLAY SUBSTRATE, AND DISPLAY PANEL

(71) Applicants: HKC Corporation Limited, Guangdong (CN); Chongqing HKC Optoelectronics Technology Co., Ltd., Chongqing (CN)

(72) Inventor: Huailiang He, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/282,330

(22) Filed: Feb. 22, 2019

(65) Prior Publication Data
US 2019/0265523 A1 Aug. 29, 2019

Related U.S. Application Data

(63) Continuation of application No. PCT/CN2018/111530, filed on Oct. 24, 2018.

(30) Foreign Application Priority Data

Feb. 24, 2018 (CN) .......................... 2018 1 0160336

(51) Int. Cl.
*G02F 1/1337* (2006.01)
*G02F 1/1343* (2006.01)
(Continued)

(52) U.S. Cl.
CPC .......... *G02F 1/1337* (2013.01); *G02F 1/1339* (2013.01); *G02F 1/13439* (2013.01);
(Continued)

(58) Field of Classification Search
CPC .. G02F 1/1337; G02F 1/1339; G02F 1/13439; G02F 1/133528; G02F 1/133514;
(Continued)

(56) References Cited

U.S. PATENT DOCUMENTS 7,843,547 B2 11/2010 Sha et al.
2010/0007842 A1* 1/2010 Terao ................... G02F 1/1339
349/153

(Continued)

FOREIGN PATENT DOCUMENTS

CN 1595236 A 3/2005
CN 101276790 A 10/2008
(Continued)

*Primary Examiner* — Shan Liu

(57) ABSTRACT

The disclosure provides a display substrate, including: a transparent substrate which includes a side surface and an edge; a transparent electrode layer formed on the side surface of the transparent substrate and covering the full side surface; and an alignment layer formed on the transparent electrode layer and covering the full surface of the transparent electrode layer; the alignment layer including a connecting region and a photosensitive region, and the photosensitive region including a photosensitive material. The disclosure also provides a manufacturing method of a display substrate, and a display panel.

8 Claims, 3 Drawing Sheets

(51) Int. Cl.
*G02F 1/1335* (2006.01)
*G02F 1/1339* (2006.01)

(52) U.S. Cl.
CPC .. *G02F 1/133514* (2013.01); *G02F 1/133528* (2013.01); *G02F 1/134309* (2013.01)

(58) Field of Classification Search
CPC .......... G02F 1/134309; G02F 1/13378; G02F 1/133788; G02F 1/133707; G02F 1/133784; G02F 1/133753; G02F 1/3775; G02F 1/133719; G02F 1/0027; G02F 1/141; G02F 2001/133738; G02F 2001/133769; G02F 2001/133776; G02F 2001/13787; G02F 2001/133746; G02F 2001/133749; G02F 2001/133773; G02F 2001/3548; G02F 2001/133742; G02F 2001/133761; G09G 2300/0495; G09G 2300/0486; H01L 21/02211; H05K 3/389; C08F 259/08; C09K 2019/548

USPC .................................................. 349/123–136

See application file for complete search history.

(56) References Cited

U.S. PATENT DOCUMENTS

| | | | |
|---|---|---|---|
| 2010/0245954 A1* | 9/2010 | Ahling | G02F 1/133784 359/30 |
| 2011/0058130 A1* | 3/2011 | Hashimoto | G02F 1/133514 349/110 |
| 2014/0192285 A1* | 7/2014 | Shinkai | H04N 13/31 349/15 |
| 2015/0062515 A1* | 3/2015 | Tomioka | G02F 1/133788 349/123 |
| 2016/0004125 A1* | 1/2016 | Li | C09K 19/56 252/512 |
| 2016/0178975 A1* | 6/2016 | Itou | G02F 1/133707 349/106 |
| 2019/0086749 A1* | 3/2019 | Sakamoto | G02F 1/136227 |

FOREIGN PATENT DOCUMENTS

| | | |
|---|---|---|
| CN | 202939392 U | 5/2013 |
| CN | 103268042 A | 8/2013 |
| CN | 103631062 A | 3/2014 |
| CN | 103676331 A | 3/2014 |
| CN | 105026994 A | 11/2015 |
| CN | 106054463 A | 10/2016 |
| CN | 106154632 A | 11/2016 |
| CN | 106383422 A | 2/2017 |
| JP | 2004004526 A | 1/2004 |

* cited by examiner

DISPLAY SUBSTRATE, MANUFACTURING METHOD OF THE DISPLAY SUBSTRATE, AND DISPLAY PANEL

CROSS REFERENCE TO RELATED APPLICATIONS

The present application is a Continuation Application of PCT Application No. PCT/CN2018/111530 filed on Oct. 24, 2018, which claims the benefit of Chinese Patent Application No. 201810160336.2 filed on Feb. 24, 2018, which is incorporated herein by reference in its entirety.

FIELD

The present disclosure relates to the field of display screens, and in particular, relates to a display substrate, a manufacturing method of the display substrate, and a display panel.

BACKGROUND

The display screens in prior art commonly includes two transparent substrates defined in parallel, and the panel is provided with a transparent electrode layer and an alignment layer. Generally speaking, the transparent electrode layer is Indium Tin Oxide (ITO) covering the full surface of the transparent substrate, while the alignment layer is Polyimide (PI). In the display screens of prior art, the alignment layer does not cover the edge position of the transparent electrode layer, and the transparent electrode layers of the two panels are connected through a frame sealant doped with gold balls, so that the transparent electrode layers of the two panels mutually conduct to realize the normal operation of the display screens, and a framework of the edge of the display screen is formed at the position where the frame sealant is disposed, also known as a "black border".

In use of electronic products, beauty has become one of the indispensable demands, and reducing the "black border" of the display screen has also become more and more necessary to meet consumers' demand In the prior art, the black border is reduced by reducing the width of the frame sealant, however, with the decrease of the width of the frame sealant, the process becomes more and more difficult and the yield is low.

SUMMARY

The main purpose of the disclosure is to provide a display substrate, a manufacturing method of the display substrate, and a display panel, aiming at solving the problems of large frame and difficult production of the display screens in prior art.

In order to solve the above problems, the present disclosure provides a display substrate including:

a transparent substrate, including a side surface and an edge;

a transparent electrode layer, formed on a side surface of the transparent substrate and covering the full side surface; and an alignment layer, formed on the transparent electrode layer and covering the full surface of the transparent electrode layer;

wherein the alignment layer includes:

a connecting region, defined as a region where the alignment layer extends inward from the edge by a first preset width, and defined to connect the frame sealant;

a photosensitive region, defined as a region where the alignment layer extends inward from the edge by a second preset width, wherein the photosensitive region comprises photosensitive material, and the first preset width is less than or equal to the second preset width.

In one embodiment, the alignment layer has a thickness of 50 nanometers to 150 nanometers.

In one embodiment, the alignment layer has a thickness of 80 nanometers to 120 nanometers.

In one embodiment, it also includes:

a polarizing layer, defined on the side of the transparent substrate away from the transparent electrode layer, the polarizer attaching to the transparent substrate; and a filter layer, defined between the transparent substrate and the transparent electrode layer.

The disclosure also provides a manufacturing method of a display substrate, which includes the following steps:

forming a transparent electrode layer on a transparent substrate;

forming an alignment layer on the transparent electrode layer, wherein the alignment layer covers the full surface of the transparent electrode layer, and the alignment layer comprises:

a connecting region, defined as a region where the alignment layer extends inward from the edge by a first preset width, and defined to connect the frame sealant;

the alignment layer further comprises:

a photosensitive region, defined as a region where the alignment layer extends inward from the edge by a second preset width, wherein the photosensitive region comprises a photosensitive material, and the first preset width is less than or equal to the second preset width.

In one embodiment, the alignment layer has a thickness of 50 nanometers to 150 nanometers.

In one embodiment, the alignment layer has a thickness of 80 nanometers to 120 nanometers.

The disclosure also provides a display panel, which includes a first display substrate and a second display substrate which are defined facing to each other, the first substrate and the second substrate include:

a transparent substrate, including a side surface and an edge;

a transparent electrode layer, formed on a side surface of the transparent substrate and covering the full side surface; and an alignment layer, formed on the transparent electrode layer and covering the full surface of the transparent electrode layer;

wherein the alignment layer includes:

a connecting region, defined as a region where the alignment layer extends inward from the edge by a first preset width;

a photosensitive region, defined as a region where the alignment layer extends inward from the edge by a second preset width, wherein the photosensitive region comprises photosensitive material, and the first preset width is less than or equal to the second preset width;

wherein the transparent electrode layer of the first substrate and the second substrate are defined facing to each other and the connecting region of the first substrate and the connecting region of the second substrate are connected by a frame sealant.

In one embodiment, a liquid crystal layer is accommodated between the first substrate and the second substrate.

In one embodiment, a conductive gold ball is distributed in the frame sealant, and the conductive gold ball comprises a sphere and a plating layer defined outside the sphere, the sphere is made of a polymer, and the plating layer is gold or platinum.

According to the technical scheme of the disclosure, the photosensitive material is defined in the alignment layer, so that when the alignment layer covers the transparent electrode layer, the transparent electrode layers of the two defined facing to each other display substrates may conduct mutually. Thus, in one aspect, the black border area of the screen may be effectively reduced, in another aspect, it is also not necessary to control the distance between the alignment layer and the edge of the transparent substrate, simplifying the production process.

BRIEF DESCRIPTION OF THE DRAWINGS

In order to more clearly explain the embodiments of the present disclosure or the technical solutions in the prior art, the drawings that need to be used in the embodiments or the description of the prior art will be briefly introduced below. Obviously, the drawings in the following description are only some embodiments of the present disclosure. For those of ordinary skill in the art, other drawings can be obtained according to the structures shown in these drawings without paying creative labor.

Figure 1:
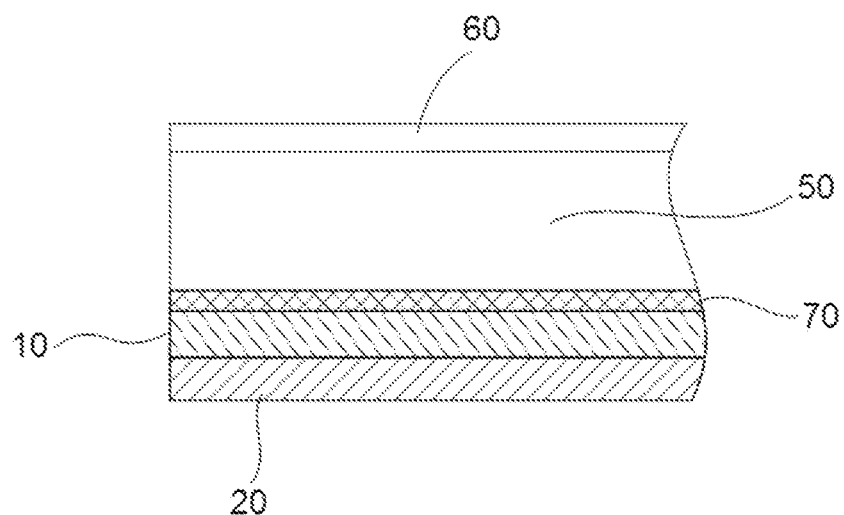
FIG. 1 is a schematic diagram of a partial structure of a display substrate according to an embodiment of the present disclosure.

The realization, functional features and advantages of the purpose of this disclosure will be further described with reference to the accompanying drawings in conjunction with the embodiments.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It should be noted that all directional indications (such as up, down, left, right, front, back, etc.) in the embodiments of the present disclosure are only used to explain the relative positional relationship, movement, etc. between the components in a certain posture (as shown in the drawings), and if the specific posture changes, the directional indication changes accordingly.

In addition, in this disclosure, the descriptions such as "first" and "second" are set for the purpose of description only, and are not to be understood as indicating or implying its relative importance or implicitly indicating the number of indicated technical features. Thus, features defining "first" and "second" may explicitly or implicitly include at least one such feature. In the description of this disclosure, "plurality" means at least two, e.g., two, three, etc., unless expressly and specifically defined otherwise.

In this disclosure, unless otherwise expressly specified and defined, the terms "connect", "fix" and the like shall be understood in a broad sense, for example, "fix" may be a fixed connection, a detachable connection, or an integral body; It can be a mechanical connection or an electrical connection. It can be directly connected or indirectly connected through an intermediate medium. It can be the internal communication of two elements or the interaction relationship between two elements, unless otherwise explicitly defined. For those of ordinary skill in the art, the specific meaning of the above terms in this disclosure can be understood according to the specific circumstances.

In addition, the technical solutions between the various embodiments according to the present disclosure may be combined with each other, but must be based on what one of ordinary skill in the art can achieve. When the combination of technical solutions is contradictory or impossible to achieve, it should be considered that the combination of such technical solutions does not exist and is not within the scope of protection required by this disclosure.

The disclosure provides a display substrate.

Referring to FIG. 1, in one embodiment, the display substrate includes a transparent electrode layer 10 and an alignment layer 20. In some embodiments, the display substrate is an Array substrate (array substrate) or a CF substrate (Color Filter substrate), the transparent electrode layer 10 is ITO, and the alignment layer 20 is PI. The transparent electrode layer 10 is formed on the transparent substrate 50, and the alignment layer 20 is formed on the transparent electrode layer 10.

As shown in FIG. 1, the transparent electrode layer 10 attaches to the alignment layer 20, and the alignment layer 20 covers the full surface of one side of the transparent electrode layer 10.

Figure 2:
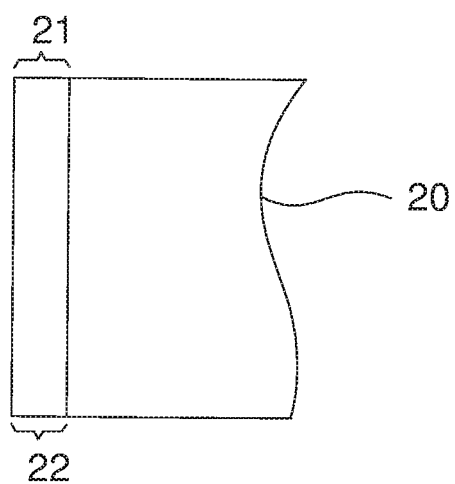
FIG. 2 is a schematic diagram of a partial structure of an alignment layer according to an embodiment of the present disclosure.
Figure 3:
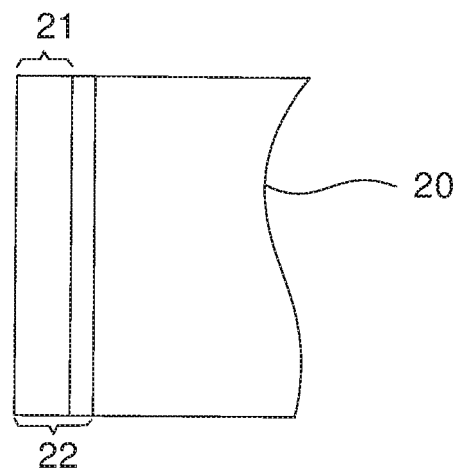
FIG. 3 is a schematic diagram of a partial structure of an alignment layer in still another embodiment of the present disclosure.

As shown in FIGS. 2 and 3, the alignment layer 20 includes a connecting region 21 and a photosensitive region 22, both of which refer to a section of the alignment layer 20, and the specific shape thereof may be defined according to the shape of the transparent substrate 50.

In some embodiments, when the transparent substrate 50 is rectangular, both the connecting region 21 and the photosensitive region 22 refer to a square-shaped region where the alignment layer 20 is located at the edge of the rectangle, the square-shaped region extending inward from the edge of the transparent substrate 50, and the width of the connecting region 21 is a first preset width and the width of the photosensitive region 22 is a second preset width, and the first preset width is less than or equal to the second preset width.

In some other embodiments, if the transparent substrate 50 is circular in shape, the connecting region 21 and the photosensitive region 22 are shaped as annular, and the width of the connecting region 21 is a first preset width, the width of the photosensitive region 22 is a second preset width, and the first preset width is less than or equal to the second preset width.

Obviously, the shape of the transparent substrate 50 may also be other shapes, and the shapes of the connecting region 21 and the photosensitive region 22 also change accordingly.

As shown in FIG. 2, in a specific embodiment, the coverage of the connecting region 21 is the same as the coverage of the photosensitive region 22, i.e., the first preset width is equal to the second preset width; Referring further to FIG. 3, in some other embodiments, the coverage of the connecting region 21 is smaller than the coverage of the photosensitive region 22, i.e., the first preset width is smaller than the second preset width.

In this embodiment, the photosensitive region 22 is defined with a photosensitive material that conducts under light. Specifically, when forming the photosensitive region 22 of the alignment layer 20, the photosensitive material is added to the raw material.

In some embodiments, the alignment layer 20 is PI and the photosensitive material is UV-sensitive. Obviously, in other embodiments, other materials or other types of photosensitive materials may be used to manufacture the alignment layer 20.

Since the first preset width is less than or equal to the second preset width, the coverage of the connecting region 21 is less than or equal to the coverage of the photosensitive region 22, that is, partial or all of the photosensitive region 22 coincides with the connecting region 21. In order to simplify the production process and reduce the production difficulty, the width of the photosensitive region 22 in this embodiment is only required to be larger than the width of the connecting region 21, and even if the coverage of the photosensitive region 22 is too large, it may not have adverse effects. Therefore, the second preset width does not need to be precisely controlled. In some embodiments, the second preset width may be defined as 0.5 mm++0.2 mm, i.e., the second preset width may be defined as 0.5 mm, while allowing an error of 0.2 mm. The processing difficulty in the process is relatively low and the requirements on the processing equipment are relatively low.

It should be understood that if a blank area is provided in the process at the edge of the alignment layer 20 and the edge of the transparent substrate 50, making part of the transparent electrode layer 10 directly exposed, the process difficulty may increase as the width of the blank area decreases. For example, if the width of the black border around the display panel needs to be controlled to be 0.3 mm, then blank areas with a width of 0.3 mm is required to be left in process, and if the width of the black border around the display panel is required to be smaller, then blank areas with a smaller width also is required to be left in process accordingly, and the processing becomes more and more difficult due to errors. However, according to the technical scheme of this embodiment, the alignment layer 20 directly covers the full surface of the transparent electrode layer 10, the technical scheme does not involve error control, and has mature processing technology and higher yield.

In the technical scheme of this embodiment, a photosensitive region 22 including photosensitive material is defined at the edge region of the alignment layer 20, so that the edge region of the alignment layer 20 is no longer insulative when the photosensitive material is conductive under illumination. Under the situation, in this embodiment, the alignment layer 20 covers the full surface of the transparent electrode layer 10, so there is no need to deliberately control the distance between the edge of the alignment layer 20 and the edge of the transparent substrate 50 in the production process.

Generally speaking, the thickness of the alignment layer 20 should be 50 nm to 150 nm In this embodiment, the thickness of the alignment layer 20 may be 80 to 120 nm, considering processing accuracy. Since the thickness of the alignment layer 20 is small, the resistance per unit area is relatively small, so that it may conduct by using a photosensitive material.

Figure 5:
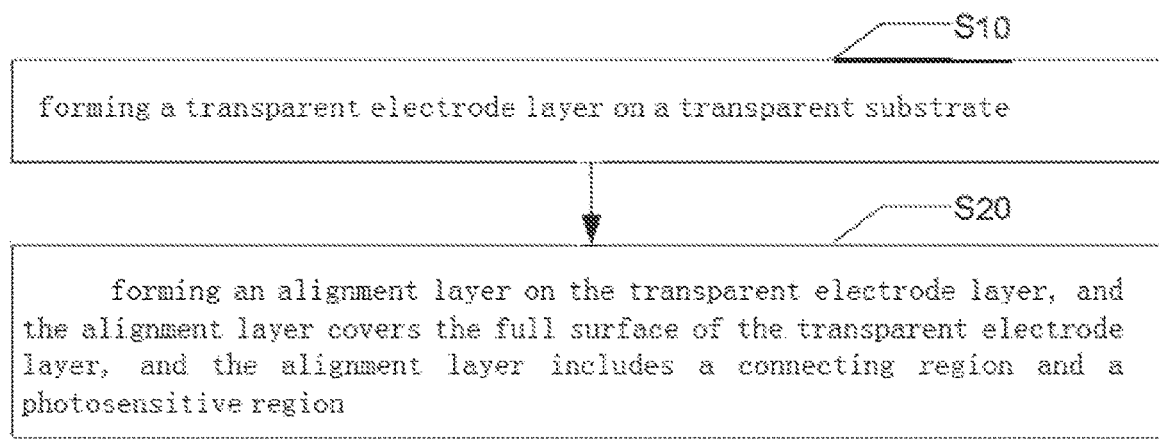
FIG. 5 is a flowchart of a manufacturing method of the display substrate according to an embodiment of the present disclosure.

In addition, in order to achieve the above object, the present disclosure also provides a manufacturing method of the display substrate. As shown in FIG. 5, in an embodiment, the manufacturing method of the display substrate includes the steps of:

S10. forming the transparent electrode layer 10 on the transparent substrate 50;

S20. forming an alignment layer 20 on the transparent electrode layer 10, the alignment layer 20 covers the full surface of the transparent electrode layer 10, and the alignment layer 20 includes:

a connecting region 21, which is an area where the distance of the alignment layer 20 from the edge of the transparent substrate 50 is less than the first preset width, and is defined to be connected with the frame sealant 30; The alignment layer 20 also includes:

The photosensitive region 22 is an area where the distance of the alignment layer 20 from the edge of the transparent substrate 50 is less than a second preset width, wherein the photosensitive region 22 includes a photosensitive material, and the first preset width is less than or equal to the second preset width.

In the manufacturing process according to some embodiments, the photosensitive material may be directly added to the raw material during the formation of the alignment layer 20, because even if all the alignment layers 20 contain photosensitive material, the area not provided with the frame sealant 30 may not conduct, thus not adversely affecting the display. In other embodiments, a group of feeding devices may also be added to the production equipment for adding photosensitive material to the raw material. When forming the central portion of the alignment layer 20, the switch of the feeding device is turned off, and the alignment layer 20 in this area does not include photosensitive material. When forming the edge region of the alignment layer 20, that is, the photosensitive region 22, the switch of the feeding device is turned on, and photosensitive material is added to the raw material of the alignment layer 20, so that photosensitive material is added to the alignment layer 20 in the edge region.

It should be understood that in the technical scheme of this embodiment, precise control is not required for the coverage of the photosensitive material, so it may be ensured that the coverage of the photosensitive region 22 defined with the photosensitive material is larger than the connecting region 21 by setting a reasonable first preset width. Therefore, in the technical scheme of this embodiment, the control process is simple and the accuracy requirement is relatively low in the production process, which is helpful to improve the yield.

Figure 4:
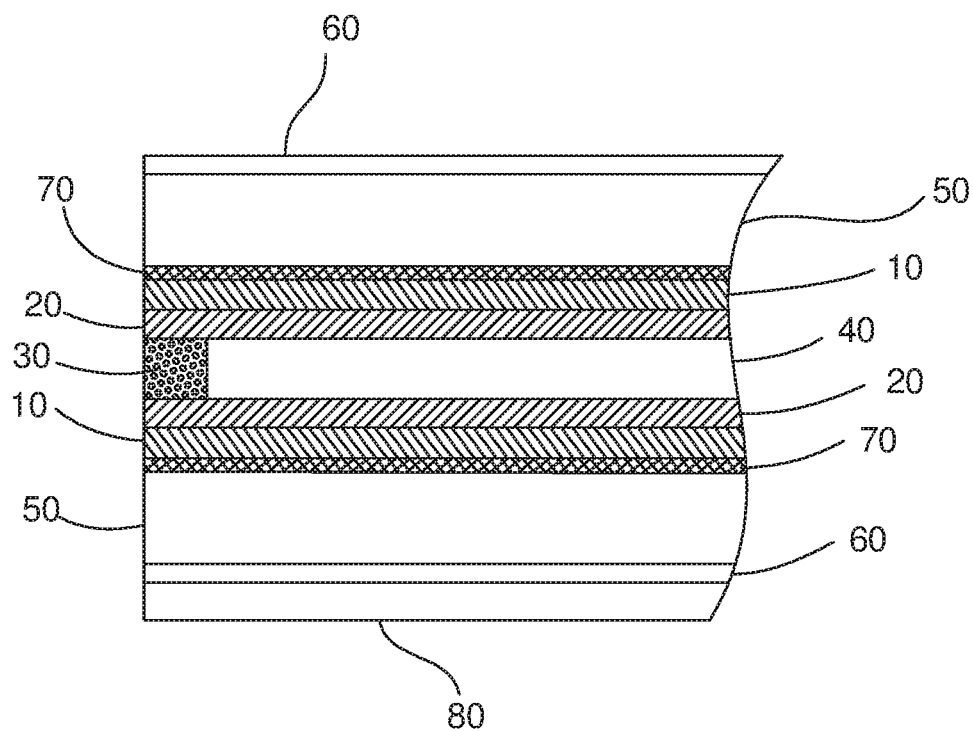
FIG. 4 is a schematic diagram of a partial structure of a display panel according to an embodiment of the present disclosure.

Please further refer to FIG. 4, in order to achieve the above object, this embodiment also provides a display panel. In an embodiment, the display panel includes a first substrate and a second substrate which are defined facing to each other. The first substrate and the second substrate are specifically the display substrate of any one of the above, the alignment layer 20 of the first substrate and the alignment layer 20 of the second substrate are defined facing to each other, and the connecting region 21 of the first substrate and the connecting region 21 of the second substrate are sealed by the frame sealant 30.

In still another embodiment, the liquid crystal layer 40 is accommodated between the first substrate and the second substrate. On the side of the first substrate away from the second substrate, a black light 80 is provided, conductive gold balls are defined in the frame sealant 30, and the conductive gold balls are uniformly distributed in the frame sealant 30. The conductive gold ball includes a sphere and a plating layer defined outside the sphere, and the sphere is made of a polymer, and the plating layer is gold or platinum to improve the conductive efficiency of the conductive gold ball.

When under use, the first substrate and the second substrate of the display panel need to be in a conducting state. In this embodiment, the photosensitive material in the photosensitive region 22 may be in a conducting state by irradiating the photosensitive region 22 with a light source, so that the transparent electrode layers 10 of the first substrate and the second substrate may conduct through the conductive gold ball in the photosensitive region 22 and the frame sealant 30, and the normal working state may be satisfied.

The technical scheme of this embodiment solves the problem that a blank area needs to be reserved for the alignment layer 20 at the edge of the display substrate to realize the conduction between the transparent electrode layers 10 of the display panel by providing the photosensitive region 22, the technical scheme effectively reduces the black border at the edge of the display panel, and simplify the production method, and is relatively mature in process.

In another embodiment, the display panel may further includes a polarizer 60 and a color filter 70 (CF), the polarizer 60 is defined on the side of the transparent substrate 50 away from the transparent electrode layer 10, the polarizer 60 attaches to the transparent substrate 50, the color filter 70 is defined between the transparent substrate 50 and the transparent electrode layer 10, that is, the transparent electrode layer 10 is actually formed on the color filter layer 70, and the alignment layer 20 is formed on the transparent electrode layer 10.

In order to realize the normal function of the display panel, the transparent electrode layers 10 of the two display substrates of each display panel are required to conduct with each other while the alignment layer 20 itself is an insulating material. Therefore, in the display panels in prior art, the alignment layer 20 cannot cover the full surface of the transparent electrode layer 10, but a certain blank area is reserved at the edge, and the frame sealant 30 is provided in the blank area to realize the conduction between the transparent electrode layers 10 of the two display panels.

According to the display panel of this embodiment, since the photosensitive area 22 is defined at the edge of each substrate, the conduction between the first substrate and the second substrate may be realized. Thus, as long as the dosage of the frame sealant 30 is properly controlled, the width of the "black border" may be reasonably controlled. In the manufacturing process, the control process is simpler and the process is more mature, so the relationship between the yield and the width of the black border may be reasonably coordinated, and the yield may be effectively improved on the premise of ensuring a certain width of the black border.

Since the technical scheme of this embodiment employs all the technical schemes of the above-mentioned embodiments, it has at least all the technical effects of the above-mentioned embodiments and will not be described in detail here.

The above are only the alternative embodiments of the present disclosure and are not therefore limiting the scope of the patent disclosure. Any equivalent structural change made under the inventive concept of the present disclosure using the contents of the present disclosure specification and drawings, or directly/indirectly applied in other related technical fields, is included in the scope of the patent protection of the present disclosure.

What is claimed is:

1. A display panel, comprising a first substrate and a second substrate facing to the first substrate, wherein both of the first substrate and the second substrate comprise:
    a transparent substrate, comprising a side surface and an edge;
    a transparent electrode layer, formed on the side surface of the transparent substrate and covering the full side surface; and
    an alignment layer, formed on the transparent electrode layer and covering the full surface of the transparent electrode layer;
    wherein the alignment layer comprises:
    a connecting region, defined as a region where the alignment layer extends inward from the edge by a first preset width;
    a photosensitive region, defined as a region where the alignment layer extends inward from the edge by a second preset width, wherein the photosensitive region comprises photosensitive material, and the first preset width is less than or equal to the second preset width;
    wherein the transparent electrode layers of the first substrate and the second substrate are defined face to face and the connecting region of the first substrate and the connecting region of the second substrate are connected by a frame sealant.

2. The display panel according to claim 1, wherein a liquid crystal layer is accommodated between the first substrate and the second substrate.

3. The display panel according to claim 1, wherein a conductive gold ball is distributed in the frame sealant, and the conductive gold ball comprises a sphere and a plating layer defined on the sphere, the sphere is made of a polymer, and the plating layer is a gold layer or a platinum layer.

4. The display panel according to claim 1, wherein the alignment layer has a thickness of 50 nm to 150 nm.

5. The display panel of claim 4, wherein the first substrate and the second substrate further comprise:
    a polarizing layer, defined on the side of the transparent substrate away from the transparent electrode layer, the polarizing layer attaching to the transparent substrate; and
    a filter layer, defined between the transparent substrate and the transparent electrode layer.

6. The display panel according to claim 4, wherein the alignment layer has a thickness of 80 nm to 120 nm.

7. The display panel of claim 6, wherein the first substrate and the second substrate further comprise:
    a polarizing layer, defined on the side of the transparent substrate away from the transparent electrode layer, the polarizing layer attaching to the transparent substrate; and
    a filter layer, defined between the transparent substrate and the transparent electrode layer.

8. The display panel of claim 1, wherein the first substrate and the second substrate further comprise:
    a polarizing layer, defined on the side of the transparent substrate away from the transparent electrode layer, the polarizing layer attaching to the transparent substrate; and
    a filter layer, defined between the transparent substrate and the transparent electrode layer.

* * * * *